United States Patent
Squires (10) Patent No.: US 6,190,279 B1
(45) Date of Patent: Feb. 20, 2001

(54) POWER TRANSMISSION SYSTEM WITH A STALL PREVENTION FEATURE

(76) Inventor: Richard D. Squires, 517 Rosebriar Ct., Greensboro, NC (US) 27407

(*) Notice: Under 35 U.S.C. 154(b), the term of this patent shall be extended for 0 days.

(21) Appl. No.: 09/410,696

(22) Filed: Oct. 1, 1999

Related U.S. Application Data (63) Continuation-in-part of application No. 09/329,673, filed on Jun. 10, 1999.

(51) Int. Cl.[7] .......................... F16H 48/06; F16H 57/08; B61D 17/00; B61D 1/00
(52) U.S. Cl. ..................... 475/149; 475/339; 105/1.5; 105/157.2
(58) Field of Search .................. 475/149, 338, 475/339; 105/1.5, 29.2, 257.2

(56) References Cited

U.S. PATENT DOCUMENTS

| | | |
|---|---|---|
| 980,847 | 1/1911 | Steinle et al. . |
| 2,106,603 * | 1/1938 | Jacques ........................... 475/149 |
| 3,134,275 * | 5/1964 | Davison ........................ 475/149 X |
| 3,604,278 | 9/1971 | Hartsell . |
| 3,641,843 | 2/1972 | Lemmens . |
| 3,658,001 * | 4/1972 | Seybold ............................... 74/394 |
| 3,665,788 | 5/1972 | Nyman . |
| 4,142,426 * | 3/1979 | Baranyi ......................... 475/338 X |
| 4,234,164 | 11/1980 | Ruark . |
| 4,274,302 | 6/1981 | Herscovici . |
| 4,274,337 * | 6/1981 | Shaw ...................................... 105/99 |
| 4,299,141 | 11/1981 | Fairchild . |
| 4,399,895 | 8/1983 | Kubo et al. . |
| 4,557,357 | 12/1985 | Tinholt . |
| 4,583,912 | 4/1986 | Ball et al. . |
| 4,676,121 | 6/1987 | Kouno . |
| 4,721,083 | 1/1988 | Hosaka . |
| 4,739,866 | 4/1988 | Reik et al. . |
| 4,779,318 | 10/1988 | Henderson . |
| 4,799,431 * | 1/1989 | Edwards et al. .............. 105/157.1 X |
| 4,861,240 | 8/1989 | Marioni et al. . |
| 4,916,975 | 4/1990 | Combastet . |
| 4,928,553 | 5/1990 | Wagner . |
| 5,121,821 | 6/1992 | Poorman . |
| 5,271,225 | 12/1993 | Adamides . |
| 5,282,444 | 2/1994 | Ito et al. . |
| 5,376,057 * | 12/1994 | Cooper et al. .................. 475/339 X |
| 5,622,244 | 4/1997 | Hansen . |
| 5,682,969 | 11/1997 | Ling . |
| 5,810,141 | 9/1998 | Organek et al. . |
| 6,007,447 * | 12/1999 | Lin ....................................... 475/149 |

FOREIGN PATENT DOCUMENTS

| | | | |
|---|---|---|---|
| 612934 * | 8/1994 | (EP) | ..................................... 475/339 |
| 647516 * | 10/1962 | (IT) | ..................................... 475/339 |

* cited by examiner

*Primary Examiner*—Sherry Estremsky
*Assistant Examiner*—Roger Pang
(74) *Attorney, Agent, or Firm*—Neil F. Markva (57) ABSTRACT

A model train locomotive has a set of drive wheels and a power system for rotating the drive wheels. The power system comprises an electric motor mounted for rotating a power input shaft, a control mechanism for regulating the amount of electric current supply to the motor for varying the rotational speed of the power input shaft, and power transmission assembly for transmitting power from the power input shaft to rotate a driven output shaft which is coupled to rotate the locomotive drive wheels. The power transmission assembly includes a flywheel and gear train for rotating the flywheel about an axis of rotation when the electric motor is rotating the power input shaft while the driven output shaft is not rotating. The gear train is effective to rotate the driven output shaft while the flywheel is rotating without stalling the electric motor when the control mechanism increases the amount of electric current supplied to the motor to increase the rotational speed of the power input shaft and rotate the locomotive drive wheels.

31 Claims, 7 Drawing Sheets

POWER TRANSMISSION SYSTEM WITH A STALL PREVENTION FEATURE

RELATED APPLICATION

This application is a continuation-in-part of U.S. application Ser. No. 09/329,673 filed Jun. 10, 1999.

FIELD OF THE INVENTION

This invention relates generally to a power transmission system for rotating a driven shaft coupled to a work performing assembly. More specifically, the invention relates to a power transmission system for driving a working assembly from start-up through various slow speeds, and at top speed without stalling the drive motor. And a specific embodiment of the invention is directed to a power transmission system for a scale model train locomotive.

BACKGROUND OF THE INVENTION

Model railroad locomotives exist in various sizes. Serious model railroaders operate these locomotives in all scales from the smallest N gauge to the largest G gauge. A locomotive may have a length greater than one foot and a weight of several pounds in the larger scales. And larger models are often used in a sight-seeing park such as a zoo. Currently, the desire to have these model locomotives operate in the same fashion as full size locomotives is thwarted because of drive motor size limitations with respect to the various available model locomotives.

Of particular importance is the manner in which these locomotives operate from a standstill to acquire an equivalent scale operation of a full-size train. The model railroader is always looking for a more realistic looking operation of the model locomotive. But because of space limitations, the motors used to drive existing model locomotives, usually called "can" motors because they look like a small can, are very small and weak.

The known electric drive motors range from about ½ inch to about 1½ inches in diameter with a length from about 1 inch to about 1¾ inches. These small direct current (DC) electric motors have a power range from about 0.002 to about 0.009 horsepower with a rotational speed range for the rotatable power shaft of the motor in the range of about 7,000 to about 16,000 revolutions per minute (rpm). The locomotive motor power shaft is connected to a drive shaft that rotates a worm and worm gearset connected to rotate the locomotive drive wheels also known as drivers. The normal installation uses a 31:1 worm and worm gear ratio to produce one revolution of the drivers for 31 revolutions of the drive shaft to provide sufficient power once the motor is running. The problem with these existing locomotives, however, is that slow realistic starts and very low speed control are difficult to achieve without stalling the drive motor.

Attempts have been made to effect the noted desired results by using pulsating current to operate the electric motors and/or by using technological advances such as skewed armatures in the motor construction itself. Yet at slow operating speeds, the armature of the electric motor turns very slowly and is thus subject to stalling from any unexpected load increase or any slight bind in the locomotive drive mechanism. Moreover, operating these motors at very slow speeds under a load for more than short time periods may soon overheat the motor causing possible motor damage.

The known motors used to drive these locomotives require 1½ to 2 volts to start the motor running for rotating a driven shaft coupled to rotate the locomotive drivers. Known locomotive drivers will not rotate on track provided until there is enough power input to the worm and worm gearset to move currently available locomotives along the track. Problems often occur when increasing electric power to the DC motor to increase the rotational speed of the motor and drive shaft. The model railroad locomotive may give a lunging or uneven thrust movement and its motor may ultimately stall. Thus, it is extremely difficult to achieve the desired result of a realistic slow motion start without stalling the locomotive drive motor or without the locomotive producing a lunging or thrusting movement because of a lack of a continuous, adequate power supply to the locomotive drive wheels.

The mechanism of the present invention used to drive scale model locomotives would be modified in each of the other potential uses for the physical and mechanical characteristics of the particular item.

U.S. Pat. Nos. 4,234,164 and 4,721,083 show different systems for producing a stall preventative feature in the power transmission train for a motor. Neither of these prior art systems are operable to achieve the results achieved in the power transmission system of the current invention.

U.S. Pat. No. 4,676,121 shows a planetary gear mechanism used in conjunction with a flywheel for producing inertia moment of the flywheel during idling. This configuration, however, is not equivalent to the structure of the power transmission system disclosed herein.

PURPOSE OF THE INVENTION

The primary object of the present invention is to provide a power transmission system for a model train locomotive to enable its motor to start and continue running while the locomotive itself is not moving.

Another object of the invention is to incorporate a power transmission system between the existing motor and the worm gearset of a standard model railroad locomotive to eliminate the long standing problems of start-up motor stall and lunging movement during a slow, variable speed operation under load.

A further object of the invention is to provide a power transmission system usable in other settings such as in the common ⅜ths inch variable speed electric drill that has a normal rotational output of 1,500 rpm for the tool-holding mechanism and a cooling fan. By using the power transmission system between the electric drive motor of the drill and the driven shaft that rotates the tool holding mechanism, a more powerful and consistent rotating capability is achieved.

Still another object of the invention is to provide a power transmission system that is adaptable for driving units having much greater loads and larger drive motors including hydraulic motors, internal combustion engines, and larger battery driven motors used in land vehicles such as golf carts, motorcycles, and automobiles, for example.

A further object is to provide a power transmission combination in an apparatus that performs a desired operational function in response to a rotating drive shaft member wherein a motor power input shaft drives the drive shaft member of the apparatus.

SUMMARY OF THE INVENTION

The power transmission combination of the invention may be placed in any apparatus that performs a desired operational function in response to a rotating drive shaft member wherein motor means includes a rotatable power input shaft means for rotating the drive shaft member and motor control means regulates the rotational speed of the power input shaft means. The combination comprises driven output shaft means coupled to rotate the drive shaft member and flywheel means mounted to rotate on shaft means about a flywheel axis of rotation. Gear train means is connected to rotate with the power input shaft means for effecting rotation of the flywheel means about the flywheel axes of rotation for rotating the driven output shaft means when the motor means rotates the power input shaft means. The gear train means is effective to rotate the flywheel means when a load is applied to the driven output shaft means so that the motor means continues to operate smoothly without being adversely affected when the motor control means increases the rotational speed of the power input shaft means for rotating the driven output shaft means through the gear train means under an increased applied load.

The power transmission assembly of the invention may be retrofit into an operational mode linking its output shaft means to a drive shaft member for operating an apparatus that performs an operational function in response to motor means that rotates power input shaft means. The transmission assembly comprises means for mounting flywheel means to rotate on shaft means about a flywheel axis of rotation and means for coupling driven output shaft means to rotate the drive shaft member of the apparatus performing the desired operational function. Gear train means is effective for rotating the flywheel means about the flywheel axis of rotation when the motor means rotates the power input shaft means. The gear train means is mounted to rotate the driven output shaft means upon rotation of the power input shaft means. The gear train means includes gear means effective to rotate the flywheel means when a load is applied to the driven output shaft means so that when the motor means increases the rotational speed of the power input shaft means to rotate the driven output shaft means in response to said applied load, the flywheel means will rotate thereby precluding an adverse effect on the operation of the motor means and providing the torque to for rotating the driven output shaft means through the gear train means.

Another feature of the invention is a power transmission system for rotating a drive shaft of an apparatus performing an operational function. The system comprises motor means for regulating the rotational speed of rotatable motor power input shaft means and a power transmission assembly for transmitting rotational power from the motor power input shaft means to rotate a driven output shaft means. The power transmission assembly includes flywheel means mounted to rotate on drive shaft about a flywheel axis of rotation and gear train means for rotating the flywheel means about the flywheel axis of rotation when the motor means rotates the power input shaft means. The gear means is effective to continue rotation of the flywheel means when a load is applied to the driven output shaft means by the drive shaft of the apparatus so that when the motor means increases the rotational speed of the power input shaft means in response to the applied load, the gear train means will drivingly rotate the flywheel means that will transmit torque to the driven output shaft means through the gear train means and preclude any adverse effect on the operation of the motor means.

In a specific embodiment of the foregoing, the gear train means includes a first sun gear fixed to rotate with the power input shaft means, a first planetary gear fixed to rotate with respect to the flywheel means about a planetary axis of rotation that is parallel to and laterally spaced from the flywheel axis of rotation, a second planetary gear mounted to rotate with the first planetary gear, and a second sun gear fixed to rotate with the power output shaft means. The first sun gear is mounted to rotate in unison with the first planetary gear and the second planetary gear is mounted to rotate in unison with the second sun gear. The diameter of the first sun gear is equal to the diameter of the first planetary gear, and the diameter of the second planetary gear has a length different from the diameter of the second sun gear.

More specifically, the first sun gear includes a set of circumferential sun gear drive teeth, and the first planetary gear includes a set of circumferential planetary driven teeth that engage and mesh with the set of sun gear drive teeth. The second planetary gear includes a set of circumferential planetary drive teeth and the second sun gear includes a set of circumferential sun gear driven teeth that engage and mesh with the set of planetary drive teeth. Each set of the circumferential drive teeth of the first sun gear and the circumferential planetary drive teeth of the first planetary gear includes the same number of teeth with respect to each other. The set of circumferential planetary drive teeth of the second planetary gear includes a greater number of teeth than the set of circumferential sun gear driven teeth of the second sun gear in one specific embodiment. In another embodiment of this invention, the set of circumferential planetary drive teeth of the second planetary gear includes a lesser number of teeth than the set of circumferential sun gear driven teeth of a second sun gear.

Another feature of the invention is directed to a power system for rotating the drive wheels of a model train locomotive. The power system comprises electric motor means mounted for rotating power input shaft means, control means for regulating the amount of electric current supply to the motor means for varying the rotational speed of the power input shaft means, and power transmission means for transmitting power from the power input shaft means to rotate driven output shaft means which is coupled to rotate the locomotive drive wheels.

The power transmission means includes flywheel means and gear means for rotating the flywheel means about an axis of rotation when the electric motor means is rotating the power input shaft means while the drive output shaft means is not rotating. The gear means is effective to rotate the drive output shaft means while the flywheel means is rotating without stalling the electric motor means when the control means increases the amount of electric current supplied to the motor means to increase the rotational speed of the power input shaft means and thus rotate the drive wheels.

The rotating of the flywheel means develops torque for application to the driven output shaft means. The power transmission system effectively provides an alternative means for the motor to continue rotating while not being sufficient to drive the locomotive drive wheels in a slow start-up without stalling the motor.

In a specific embodiment, the gear means includes first sun gear means fixedly mounted on first drive shaft means to rotate with the first drive shaft means about a first axis of rotation, second sun gear means fixedly mounted on and effective to rotate with the driven output shaft means, and first and second planetary gear means fixedly mounted on and effective to rotate with second drive shaft means about a second axis of rotation. The second draft shaft means is rotatably mounted to the flywheel means with the second axis of rotation being laterally spaced from and parallel to the first axis of rotation. The first planetary gear means is frictionally drivingly engaged with the first sun gear means and the second planetary gear means is frictionally drivingly engaged with the second sun gear means.

The power input shaft means is coupled directly to the first drive shaft means to effect rotation of the first sun gear means about the first axis of rotation and the flywheel means is rotatably mounted on the first drive shaft means to also rotate about the first axis of rotation independently and separate from the first drive shaft means. The first drive shaft means includes an input end portion coupled to the power input shaft means, a bearing end portion having an outer surface bearing section, and a intermediate portion located between the input and bearing end portions and having an outer intermediate surface to which the first sun gear means is affixed. The driven output shaft means includes an inner end section having an outside end surface to which the second sun gear means is affixed, and an inside end bearing surface that frictionally rotatably supports the outer surface bearing section of the first drive shaft means. In a specific embodiment, the first drive shaft means and driven output shaft means are coaxial.

A particular feature of the invention is directed to the power input shaft means coupled to the first drive shaft means with drive shaft support means that mounts the first drive shaft means to rotate about the first axis of rotation. And driven shaft support means mounts the driven output shaft means to rotate about the first axis of rotation. The drive shaft support means in a specific embodiment of the invention is disposed at a first end of an intermediate support section and the driven shaft support means is disposed at a second end of the intermediate support section. The drive shaft support means, the driven shaft support means, and the intermediate support section together form a U-shaped structural configuration when the configuration is viewed in an elevational direction transverse to the first axis of rotation.

A more specific feature of the invention is directed to a power transmission system wherein each of the first sun gear means, second sun gear means, first planetary gear means, and the second planetary gear means consists of a single gear member having a preselected number of circumferential teeth. Such a system thus has two sun gear members and two planetary gear members. The flywheel means includes first and second flywheel sections laterally spaced with respect to each other with the second drive shaft means extending between and rotatably mounted on the first and second flywheel sections. The first planetary gear member is disposed between the first and second flywheel sections and the second planetary gear member is disposed on a side of one of the flywheel sections opposite a side where the other flywheel section is disposed. Counter-balancing means is circumferentially disposed at a location between the flywheel sections to balance the total weight of the second drive shaft means and the first and second planetary gear members carried on the second drive shaft means.

In a more comprehensive application, the power transmission system of the invention rotates driven output shaft means for operating an assembly used to perform any desired operational function where smooth, steady power can be developed without an adverse effect on the particular drive motor. The system comprises motor means for rotating power input shaft means, motor control means for regulating the amount of power to the motor means to vary the rotational speed of the power input shaft means, and power transmission means for transmitting power from the power input shaft means to the driven output shaft means. The power transmission means includes torque development means that provides an alternative path for using the energy of the drive motor without the drive motor being subject to any load placed on or carried by the driven output shaft means except the rotational drive energy required to rotate and accelerate the torque development means.

Energy transmitting means provide rotational energy to the torque development means when the motor means is rotating the power input shaft means while the driven output shaft means may not be rotating because of a load applied to it. The energy transmitting means is operatively coupled to the torque development means to rotate the driven output shaft means without stalling the motor means when the motor control means increases the amount of power to increase the rotational speed of the input shaft means.

BRIEF DESCRIPTION OF THE DRAWINGS

Other objects of this invention will appear in the following description and appended claims, reference being made to the accompanying drawings forming a part of the specification wherein like reference characters designate corresponding parts in the several views.

DETAILED DESCRIPTION OF THE INVENTION

Figure 1:
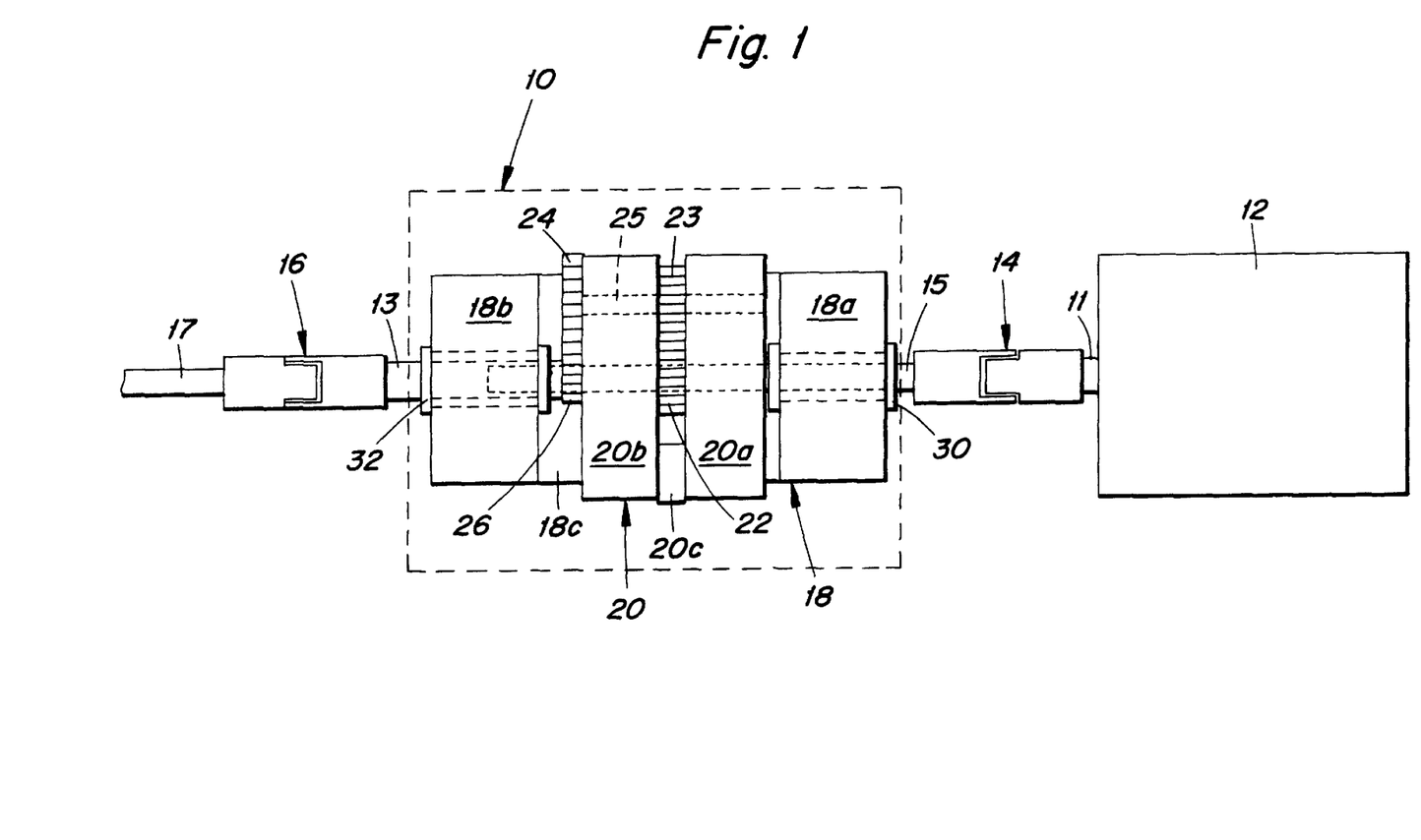
FIG. 1 is a top plan view of an assembly made in accordance with the invention.
Figure 3:
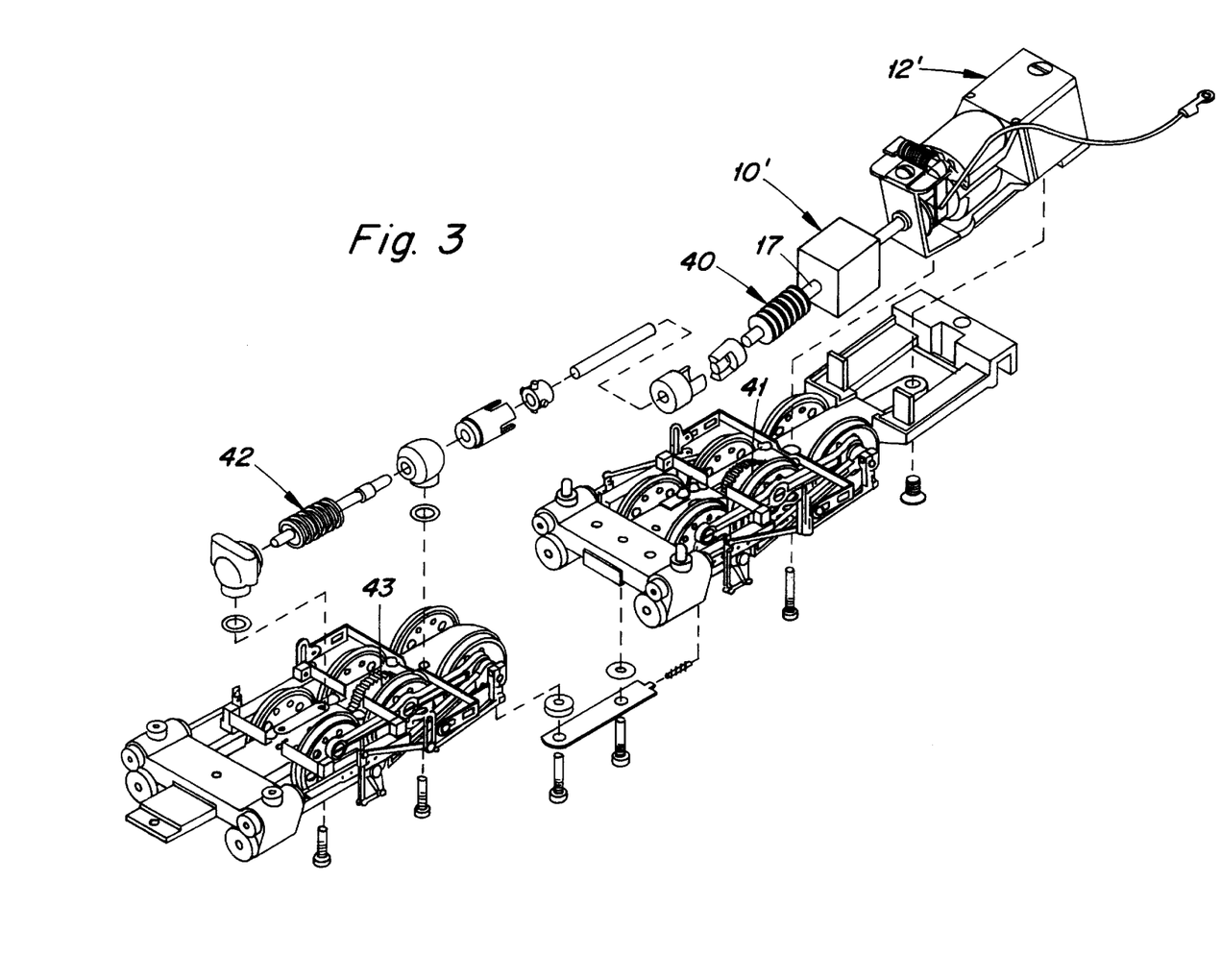
FIG. 3 is an exploded perspective view of a power transmission system used to operate the drive wheels of a locomotive in accordance with the invention.

FIG. 3 shows the current state of the art with respect to a model train drive system into which the invention is disposed. Worm gears 40 and 42 mesh with spur gears 41 and 43, respectively, to form a worm and worm gearset that rotates the locomotive drivers with motor 12'. Power transmission unit 10' disposed between motor 12' and first worm gear 40 shows how the power transmission assembly 10 of FIG. 1 is used according to the invention. No such transmission currently exists in the standard model train locomotive driven by DC electric motor 12' that is normally connected to drive shaft 17 as shown. Drive shaft 17 rotates worm gears 40 and 42 and corresponding worm engaging spur gears 41 and 43 in the standard manner. The size of motor 12' will vary depending upon the size and weight of the locomotive.

The drivers shown in FIG. 3 are standard equipment for a Bowser, HO Challenger Kit No. 100300 produced by Bowser Manufacturing Co. of Montoursville, Pa. While the power transmission system 10' is diagrammatically shown in line with motor 12' and worm and worm gear set 40, 41, the power transmission system 10 and motor 12 of FIG. 1 may both be placed in a single housing or the flywheel and gear train assembly made an integral part of the motor housing itself. It is also contemplated that the motor and power transmission system assembly be disposed in the model tender coupled to the rear of the locomotive.

Figure 2:
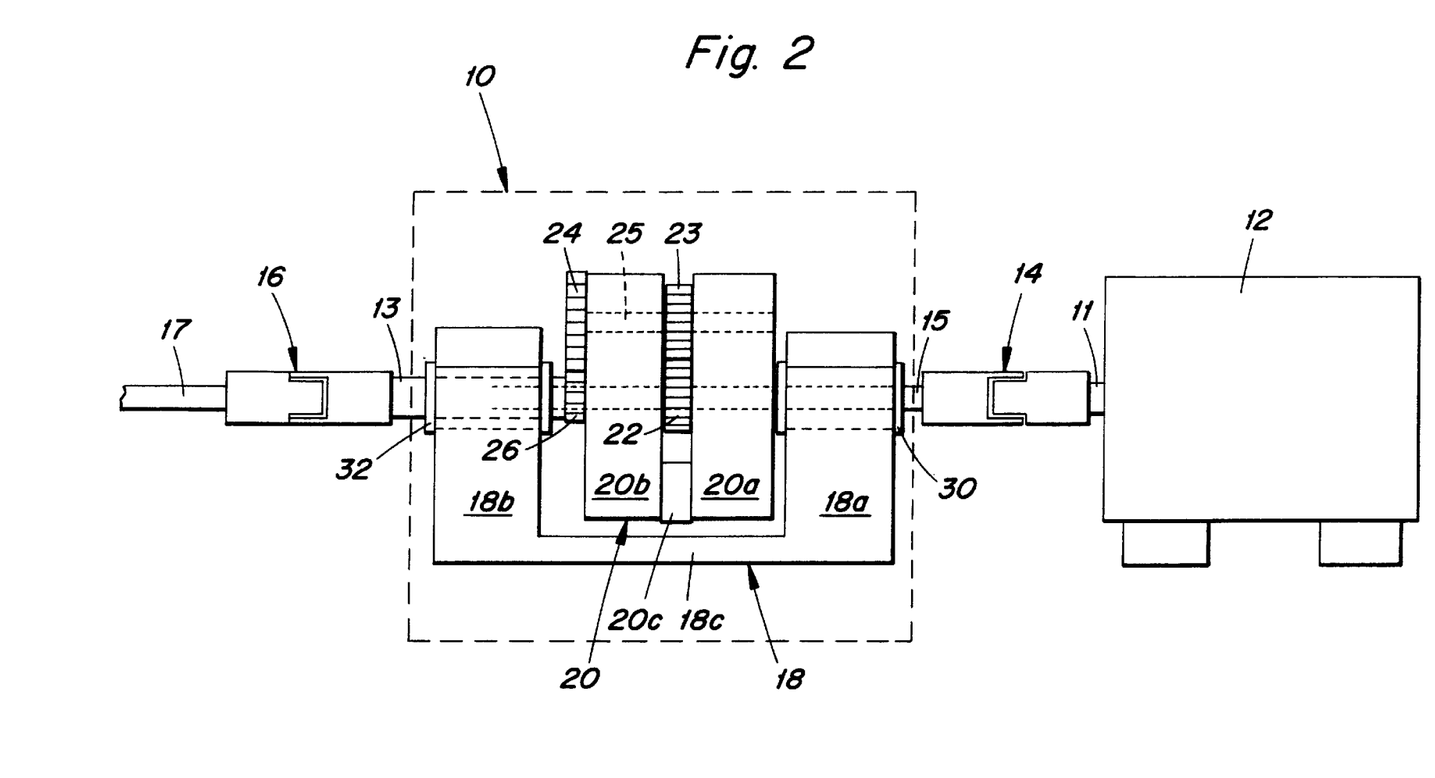
FIG. 2 is a schematic elevational view of the assembly of FIG. 1.

In the embodiment shown in FIGS. 1 and 2, motor 12 rotates power shaft 11 coupled to input drive shaft 15 through universal coupling joint 14. Drive shaft 15 passes through flange bearing 30, split flywheel, generally designated 20, and extends into the inner end of coaxially disposed driven output shaft 13. Shaft 15 terminates at a point about half-way along the length of flange bearing 32 as shown. Sun gear 26 is affixed to the outside end surface of the inner end section of driven output shaft 13. The inner end shaft 13 includes an inside end bearing surface that frictionally rotatably supports the outer surface bearing section of drive shaft 15. In other words, the bearing end section of drive shaft 15 fits rotatably and slidably fixed into the end section of driven output shaft 13 as shown. Flywheel assembly 20 has two sections 20a and 20b interconnected by counter-balance portion 20c all of which are rotatably mounted on shaft 15 and thus rotate about a first flywheel axis of rotation corresponding to the longitudinal axis of shaft 15. A first sun gear member 22 is affixed to an intermediate portion of shaft 15 to rotate with shaft 15 about the first axis of rotation separate from rotating flywheel assembly 20.

A first input sun gear 22 has 20 gear drive teeth that mesh with driven teeth of the input planetary gear member 23 also having 20 teeth. Sun gear 22 and planetary gear 23 are of the same size therefore rotate with respective drive shafts 15 and 25 at the same rotational speed with respect to each other. Planetary gears 23 and 24 are each fixed to the second drive shaft 25 that extends into and through flywheel sections 20a and 20b as shown. As shown, planetary gear 24 is larger than planetary gear 23 and therefore necessarily has more teeth. Sun gear 26 is smaller than sun gear 22 and planetary gear 24 and therefore necessarily has fewer teeth than either of these gears. Counter-balance portion 20c balances the weight of flywheel assembly 20 to correspond with the weight of second drive shaft 25 and planetary gears 23 and 24. Driven output shaft 13 is coupled to shaft 17 through universal joint 16. When driven shaft 17 is rotated, the worm gears 40 and 42 (FIG. 3) rotate while engaged with worm-engaging spur gears 41 and 43, respectively, to rotate the locomotive's drive shaft member and thus drive it along a track.

Drive shaft support assembly, generally designated 18, includes an intermediate support section 18c with a drive shaft support 18a disposed at a first end thereof and a driven shaft support 18b disposed at the other end of intermediate section 18c. Drive shaft support section 18a mounts first drive shaft 15 in the flange bearing 30 and driven shaft support 18b mounts the driven output shaft 13 to rotate within flange bearing 32. Drive shaft support 18a, driven shaft support 18b, and intermediate support section 18c together form a U-shaped structural configuration of the support assembly 18 when the configuration is viewed in an elevational direction transverse to the first axis of rotation as shown in FIG. 2.

As shown, flywheel assembly 20 includes two sections 20a and 20b that are laterally spaced with respect to each other with second drive shaft 25 extending between and rotatably mounted in these flywheel sections. First planetary gear member 23 is disposed between first and second flywheel sections 20a and 20b and second planetary gear member 24 is disposed on a side of section 20b opposite the side where first flywheel section 20a is disposed. Counter-balance weight 20c is fixed between flywheel section 20a and 20b and circumferentially disposed at a location to balance the combined weight of second drive shaft 25 and first and second planetary gear members 23 and 24 carried on drive shaft 25.

In operation, when motor 12 starts to rotate power shaft 11 and first drive shaft 15, with only slightly more current to motor 12 than its no-load start-up requirement, the power of motor 12 will take the path of least resistance. Flywheel assembly 20 will therefore start rotating clockwise on shaft 15 so that planetary gear 24 moves around sun gear 26 as first sun gear 22 rotates with drive shaft 15. If flywheel assembly 20 were to remain stationary and second sun gear 26 were not engaged with the planetary gear 24, sun gear 22 and planetary gears 23 and 24 would all rotate at the same rotational speed because sun gear 22 and planetary gear 23 are the same size and thus have the same number of teeth.

With the larger planetary gear 24 engaged with the smaller driven sun gear 26, however, planetary gear 24 will rotate around sun gear 26 so that even at very slow start-up speeds, any resistance that flywheel assembly 20 has to rotating will be transmitted as an equal torque to also rotate sun gear 26 in the same clockwise direction.

Under standard conditions, worm gears 40 and 42 as shown in FIG. 3 have a ratio of 31 revolutions to 1 revolution of spur gears 41 and 42 that drive the locomotive drive wheels. The small resistance created by the rotating flywheel assembly 20 is not only strong enough to move the locomotive but strong enough to spin the drivers if the locomotive is manually held and not allowed to move.

In this embodiment, flywheel assembly 20 is about ¾ of an inch in diameter and each flywheel segment 20a and 20b is about ¼ of an inch thick. Flywheel assembly 20 is made of steel and weighs about two ounces. Power transmission system 10 including the flywheel sections 20a and 20b and its gear train arrangement enables the small motor 12 to rotate flywheel assembly 20 without stalling the motor and as power and rotational speed of motor 12 is increased as discussed. Consequently, the locomotive will begin a very slow smooth start without stalling the motor or without producing any kind of jerking thrust movement.

As the rotational speed of flywheel assembly 20 increases, the amount of torque is transferred to rotate output shaft 13, and drive shaft member 17 by way of coupling 16. Motor 12 in combination with power transmission system 10 will never stall regardless of the amount of load imposed through the locomotive because flywheel assembly 20 will simply continue to rotate and create the torque required to move such a load. That is, the train of gears 22, 23, 24, and 26 will drivingly rotate flywheel assembly 20 to transmit torque effective to rotate the driven output shaft means 13, 16, and 17 and to preclude an adverse effect on the operation of motor 12. In short, any additional load placed on driven output shaft 13 will be diverted from having any effect on motor 12 because of the planetary and sun gear arrangement that operates flywheel assembly 20.

In any given specific embodiment of the invention, the total power output from the transmission can be altered by either decreasing or increasing the size, weight and speed of flywheel assembly 20. And the size, weight and speed of flywheel assembly 20 determines the amount of torque that the transmission delivers to rotate output shaft means 13, 16, and 17.

In summary, motor 12 will start to rotate with only slightly more current than the motor's no-load start-up requirement. Once motor 12 is running, it will not stall regardless of the amount of load on driven shaft 13 as noted. And even if output shaft 17 could be secured so that it is not rotating, flywheel assembly 20 will continue to rotate planetary gear 24 around sun gear 26 thereby precluding the potential stalling of motor 12. Therefore, if the model locomotive is running alone or pulling a 50 car train, motor 12 will never stall while the power transmission system of the invention supplies a very slow speed control capability. As the speed of motor 12 is increased, the rotational speed of flywheel assembly 20 increases thereby creating more torque, which is delivered to the locomotive drivers through planetary gear 24 that rotates driven sun gear 26. The locomotive will have a very steady and smooth acceleration and when the throttle is fully opened, the locomotive will accelerate at about the same speed as the current state of the art.

Another advantage of the invention is that the power transmission system of the invention will automatically adjust to any load increase without changing the throttle setting. The rotational speed of flywheel assembly 20 will increase transmitting more torque to the locomotive and will automatically adjust to any gear reduction required to do the job with the available power.

Figure 4:
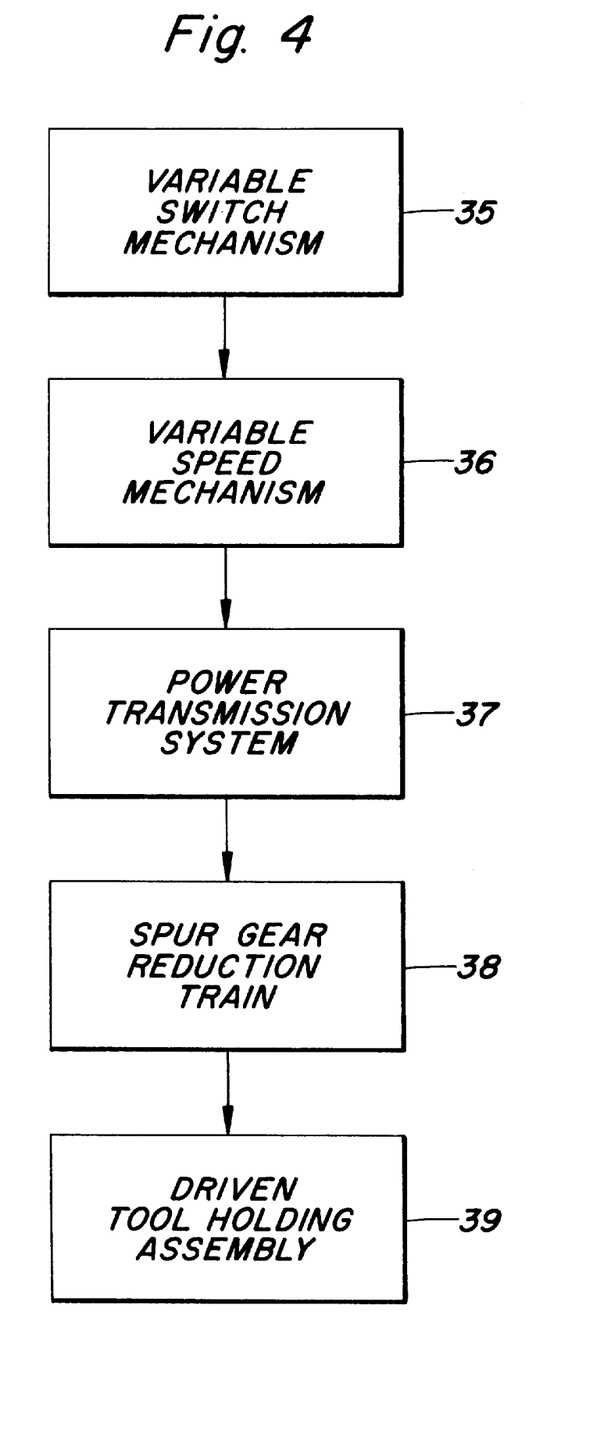
FIG. 4 is a diagrammatic view of how a power transmission system of the invention is used with hand-held electric variable speed drill.

In another embodiment of the invention, the power transmission system 37 schematically shown in FIG. 4 is installed between a variable speed electric motor and the spur gear reduction train that drives a tool holding assembly of a common ⅜ inch variable speed electric drill. The same results achieved with the model locomotive drive are gained when used in the variable electric drill.

The drill includes a variable switch mechanism 35 and a variable speed motor 36. A power transmission system 37 of the invention includes a combination of a flywheel and a sun gear/planetary gear train as in the earlier embodiment. The electric motor has a fan to cool the motor and is the first component attached to the drive shaft that ultimately drives the tool-holding assembly. The driven shaft of the drill goes into a spur gear reduction train to arrive at a normal 1,500 rpm output. Power transmission 37 is attached between the cooling fan and the spur gear reduction train 38, which is part of the driven tool-holding assembly 39. Upon increasing the amount of rotational speed using the variable switch mechanism 35 for driving the variable speed motor 36, the flywheel assembly of the power transmission 37 will increase in rotational speed but transmit a more powerful reduction to the shaft that drives the tool-holding assembly in the precise manner as described with respect to the first embodiment of FIGS. 1–3.

Figure 5:
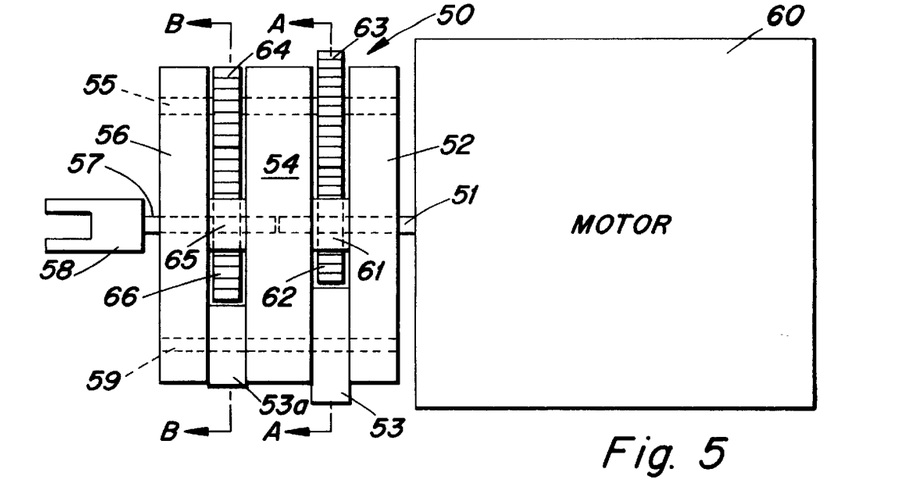
FIG. 5 is a diagrammatic side elevational view of a power transmission system made in accordance with the invention.
Figure 6:
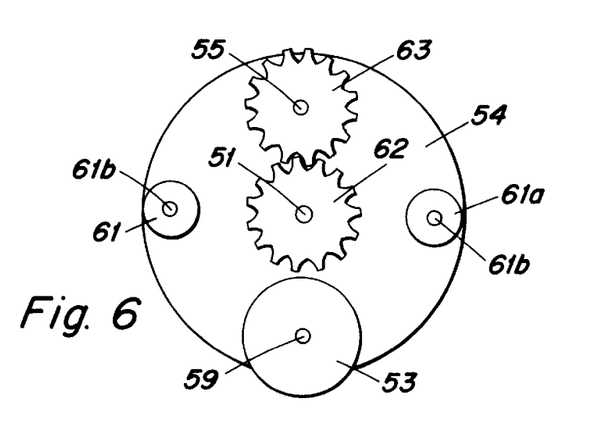
FIG. 6 is a cross-sectional view along line A—A of FIG. 5.
Figure 7:
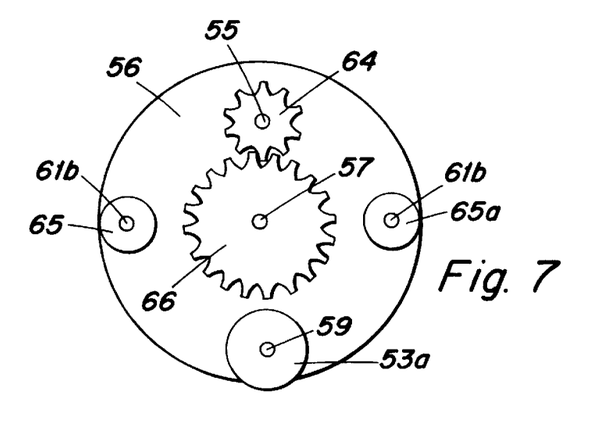
FIG. 7 is a cross-sectional view along line B—B of FIG. 5.
Figure 8:
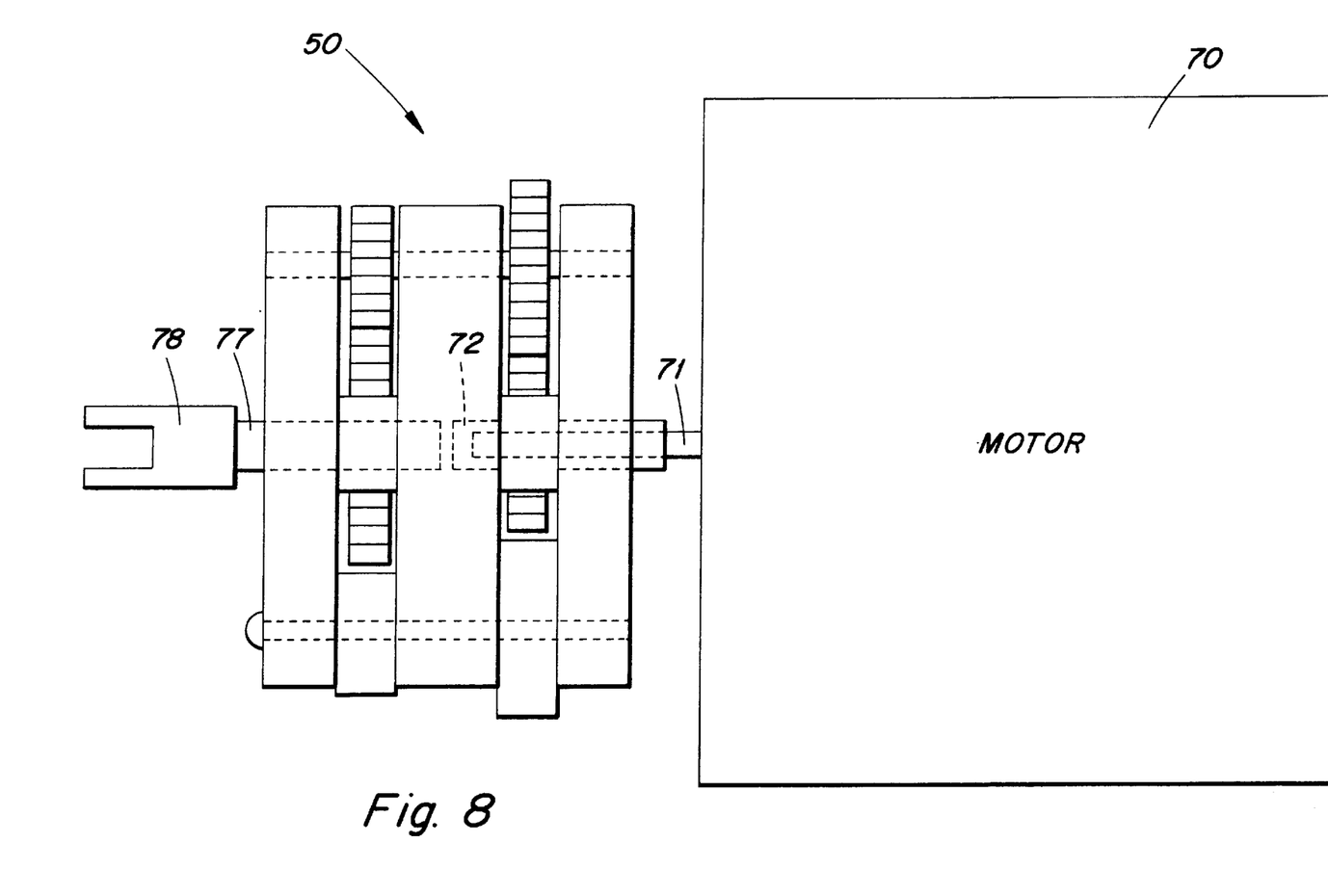
FIG. 8 is a diagrammatic side elevational view of another embodiment of a power transmission system of the invention.

The embodiment of FIG. 5 shows a transmission system mounted directly on motor power input shaft 51 without a separate external bearing structure as used in the earlier embodiments. The power transmission combination includes a flywheel assembly, generally designated 50, having three flywheel sections 52, 54, and 56 rotatably mounted to motor power input shaft 51 and output driven shaft 57. A gear train includes a first sun gear 62, first planetary gear 63, second planetary gear 64, and second sun gear 66 that press fit to each respective shaft on which it is mounted. Machine screw 59 extends through counter-balance weights 53 and 53a, flywheel sections 54 and 56, and threadingly engages a threaded hole in flywheel section 52, as shown, to secure these parts together to form flywheel assembly 50. Bolts 61b fixedly mount spacers 61, 61a, 65, and 65a in place with flywheel sections 52, 54, and 56, as shown.

First sun gear 62 has fifteen circumferential drive teeth that respectively engage and mesh with the fifteen driven teeth of first planetary driven gear 63. Drive shaft 55 is rotatably mounted to and disposed on a radius of flywheel segments 52, 54, and 56, and rotates about a planetary axis of rotation that is parallel to and spaced from the flywheel axis of rotation. In this embodiment, the flywheel axis of rotation is coextensive with the axis of rotation of input shaft 51. Planetary driven gear 63 necessarily rotates in unison with sun gear 62 because of the equal number of teeth that mesh in gears 62 and 63. Planetary gears 63 and 64 rotate in unison with drive shaft 55 and second planetary drive gear 64 rotates in unison with the engaged driven teeth of second sun gear 66. Counter-balance weights 53 and 53a balance the weight of drive shaft 55 and planetary gears 63 and 64 along the flywheel assembly diameter.

Output drive shaft 57 freely rotates in flywheel sections 54 and 56. Output sun gear 66 fixedly rotates with output driven shaft 57 that drivingly connects flywheel assembly 50 through coupling portion 58 to the drive shaft member (not shown) of an apparatus that performs any desired operational function. In the earlier embodiment shown in FIG. 3 the apparatus is a model locomotive having an operational function of traveling along a track. Second planetary gear 64 has ten drive teeth and operates in unison with second sun gear 66 having twenty driven teeth so that the rotational speed of sun gear 66 is one-half that of planetary gear 64 if flywheel assembly 50 were to remain stationary with motor 60 rotating shaft 51. Flywheel sections 52, 54, and 56 freely rotate with respect to motor output shaft 51 and system output shaft 57 so that regardless of the load on output shaft 57, motor 60 will continue to smoothly rotate flywheel assembly 50.

In operation, motor 60 starts to rotate power shaft 51 and sun gear 62, planetary drive shaft 55 that fixedly carries planetary gears 63 and 64 also rotates. And with only slightly more current to motor 60 than required for a no-load start-up, the rotational power from motor 60 will take the path of least resistance. The gear train will therefore rotate flywheel assembly 50 about shafts 51 and 57 to carry planetary gear 64 around first sun gear 62 that rotates with power input shaft 51. If flywheel assembly 50 were to remain stationary and second sun gear 66 were not engaged with planetary gear 64, planetary gears 63 and 64 would rotate with shaft 55 about the planetary axis of rotation at the same rotational speed as the rotational speed of first sun gear 62. With planetary gear 64 engaged with driven sun gear 66, however, planetary drive gear 64 will rotate around sun gear 66 so that even at very slow start-up speeds, any resistance from flywheel assembly 50 will be transmitted as an equal torque to also rotate sun gear 66 in a gear reduction mode. If planetary gears 63 and 64 and shaft 55 rotate fifty revolutions about the planetary axis of rotation that means that power input shaft 51 is rotating 50 revolutions. At the same time, however, the flywheel assembly 50 remains free to rotate about shafts 51 and 57 depending on the load applied to driven output shaft 57.

As in the earlier embodiments, planetary gears 63 and 64 rotate about the planetary axis of rotation of shaft 55 in a counter-clockwise direction when meshed with sun gear 62 that rotates clockwise with power input shaft 51. At the same time, the flywheel assembly 50 is free to rotate, about shafts 51 and 57 carrying with it the drive shaft 55 and planetary gears 63 and 64. Flywheel assembly 50 will rotate in either a clockwise or counter-clockwise direction depending upon the relative sizes of each gear in the flywheel gear train and the load applied to output shaft 57. A most important function of flywheel assembly 50 is that it is free to rotate regardless of the load applied to driven output shaft 57 thereby protecting the drive motor 60 from any adverse effect that might be otherwise caused by such a load if power input shaft 51 were directly connected to the apparatus performing the desired operational function as currently exists in the prior art. The new and unexpected results attained in using the flywheel assembly of the invention in driving model train locomotives is particularly significant in the modeling industry.

The rotational speed of flywheel assembly 50 about shafts 51 and 57 will vary as the load on output shaft 57 changes. In the earlier embodiment where the second planetary gear 24 is larger and thus has more teeth than driven output sun gear 26, flywheel assembly 50 generally rotates clockwise with shafts 15 and 13. In the embodiments of FIGS. 5–9, however, planetary gear 64 is smaller and has fewer teeth than sun gear 66. Thus, when a load is applied, planetary gear 64 begins to walk in a counter-clockwise direction about driven output shaft 57 thus carrying flywheel assembly 50 in a counter-clockwise direction. In short, regardless of the load being applied to output shaft 57, motor 60 is unaffected because it simply continues to rotate flywheel assembly 50 and carry planetary gears 63 and 64 along with it. Under these circumstances, the greater the load on output shaft 57, the faster flywheel assembly 50 rotates in a counter-clockwise rotation about shafts 51 and 57. Therefore, as the rotational drive power of motor 60 increases, the flywheel assembly of the invention precludes any stalling effect on motor 60 or lunging of the locomotive regardless of the load being applied.

With this embodiment, flywheel assembly 50 can rotate counterclockwise about shafts 51 and 57 at the same rotational speed that gears 62, 63, and 64 are rotating with shafts 51 and 55. If that happens, it takes more rotational energy from motor 60 to keep the flywheel rotating counter-clockwise so that the torque created is equal to the torque required to rotate output shaft 57 clockwise.

The effect of the freely rotating flywheel assembly in either a clockwise or counter-clockwise rotation around the power shaft of motors 12, 12', 60, or 70 of the various embodiments described herein produces a smooth increase and decrease of movement for the locomotives of the invention or any other vehicle or apparatus in which the novel power transmission assembly is coupled between a motor or prime mover and the drive shaft member of an apparatus that performs a desired operational function. Motors 12, 12', and 73 represent commercially available can motors commonly used to drive model locomotives. Motors 60 and 70 may also represent such can motors but also might be any motor used to drive any apparatus to perform a desired operational function.

In the specific embodiments of FIGS. 1–7, a novel unit of the invention includes a motor and flywheel transmission assembly as a complete unit factory installed in a model locomotive. As shown in FIGS. 3 and 5, the combination of a motor and flywheel assembly might be used to retrofit an existing locomotive after removing its original equipment motor. The embodiment of FIG. 8, moreover, discloses a flywheel power transmission assembly 50 that can be retrofit to power shaft 71 of motor 70. The flywheel assembly shafts 72 and 77 have a diameter larger than the common 1/8 or 3/32 inch diameters used for motor power shaft 71. The modeler simply needs to bore a hole in assembly shaft 72 with a diameter that will receive the end of shaft 71, place an adhesive on shaft 71, and then insert it into the drilled bore of shaft. 72, as shown. In some instances, the bore hole of this embodiment may be bored by the manufacturer to eliminate the first step of the foregoing installation process.

In the embodiments used for the power transmission system in a model locomotive, flywheel sections 52 and 56 are 0.100 inch thick, section 54 is 0.225 inch thick and all three flywheel sections are made of cold-rolled steel. Gears 62, 63, 64 and 66 have a thickness of less than 0.100 inch. The overall diameter of the flywheel assembly may be less than 0.750 inch but the size of each portion of the flywheel assembly of the invention will depend on its particular application. Therefore, when used on vehicles that transport people or equipment used in manufacturing parts or otherwise processing production materials, the relative overall size of the flywheel assembly will be much larger with its separate parts being made larger accordingly. For example, if so desired, a flywheel assembly of the invention may be adapted for use in driving full size locomotives or in any other situation where a prime mover is rotating an output shaft for driving a load associated with performing a desired operational function.

Figure 9:
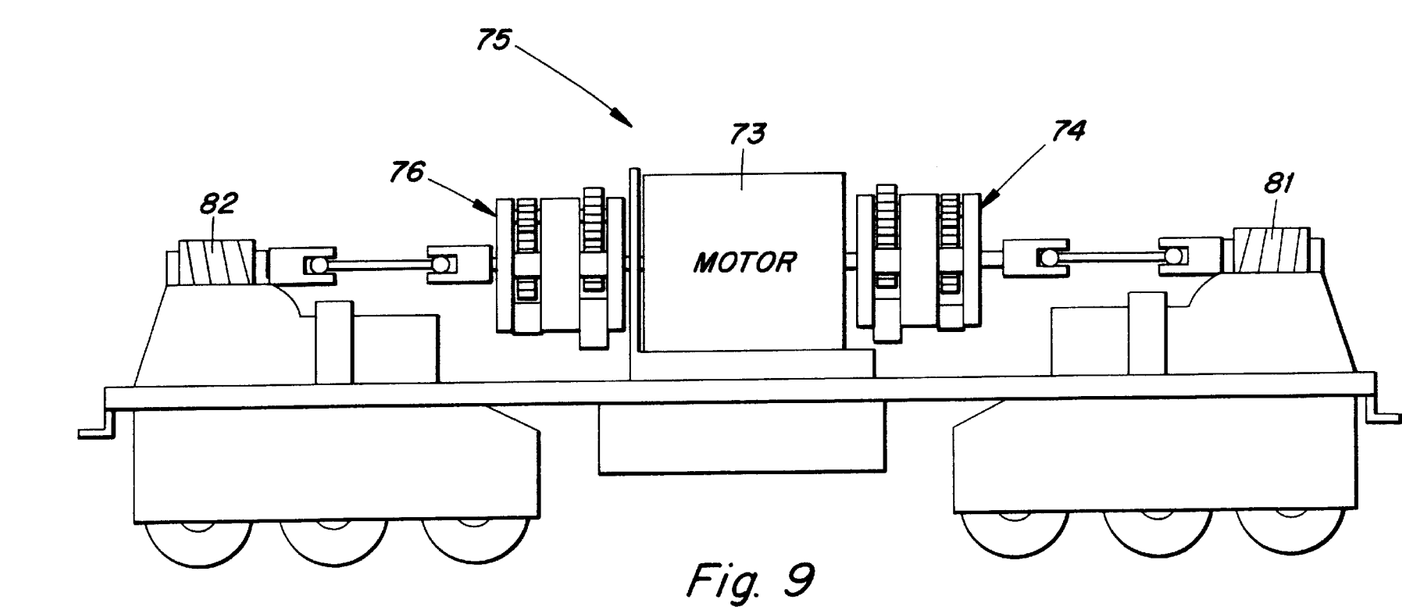
FIG. 9 is a diagrammatic side elevational view of a power transmission system of the invention used to operate drive wheels of a locomotive.

The embodiment of FIG. 9 shows a model locomotive drive system 75 having flywheel assemblies 74 and 76 fitted to both ends of can motor 73 to rotate worm gears 81 and 82. This embodiment is particularly adaptable to the known Athearn H24-26 TRAINMASTER model diesel locomotive. The locomotive may be manufactured with this drive system at the factory or retrofit to those already owned by a modeler since it requires no more room for installation than the original drive motor and its two attached flywheels. The invention contemplates the production of complete retrofit kits that includes an appropriately sized can motor, motor mount fixtures, and flywheel power transmission(s) of the invention, with appropriately sized input drive and output driven shafts.

The gear train as shown in the various embodiments includes gear members having teeth that are directly engaged so that clockwise rotation of sun gear 62, for example, will produce a counter-clockwise rotation of planetary gears 63 and 64 about the planetary axis of rotation, and clockwise rotation of output sun gear 66 about its axis of rotation. It is contemplated that a gear train having an endless closed belt or chain mounted to rotate each sun gear and planetary gear combinations can be adapted for use in a flywheel assembly of the invention in the same manner as described herein. In this instance, however, the use of such an endless belt about each sun gear and planetary gear pair will cause the gears to rotate in the same direction about their respective axes of rotation. The principles associated with such a gear train for the power transmission system of this invention, however, will not change the function of the unique flywheel assembly.

Any number of modifications can be made in the relative size of each of the gears or number of teeth involved in rotating the output shaft so long as the flywheel is freely rotatable apart from the power input shaft so that the motor is not adversely affected by any load applied to a driven output shaft. Any such modifications to the power transmission system of this invention will be determined by the nature and condition of operation for the particular apparatus to which it is applied.

In the power transmission assembly of the invention, the flywheel assembly may rotate clockwise or counter-clockwise depending upon the load being applied and the comparative sizes of the gears involved. The circumstance may be such that the flywheel does not turn at all. However, once a load is applied, it may turn in either direction depending upon the specific forces being handled through the power transmission system.

Where different sized gears are used, a significant gear reduction may be effected so that as the flywheel assembly rotates very rapidly, it will enable the driven output shaft to rotate at a fewer number of revolutions thereby effecting a gear reduction so that much greater loads could be handled than is otherwise now possible with power input shafts being directly linked in a 1:1 rotational relationship to the drive shaft member of an apparatus that performs a desired operational function.

While the power transmission system has been shown and described in detail, it is obvious that this invention is not to be considered as limited to the exact form disclosed, and that changes in detail and construction may be made therein within the scope of the invention without departing from the spirit thereof.

Having thus set forth and disclosed the nature of this invention, what is claimed is:

1. In an apparatus that performs a desired operational function in response to a rotating drive shaft member wherein motor means includes a rotatable power input shaft means for rotating the drive shaft member, and motor control means regulates the rotational speed of the power input shaft means, a power transmission combination comprising:
   a) driven output shaft means coupled to rotate said drive shaft member,
   b) flywheel means mounted to rotate on shaft means other than said driven output shaft means and about a flywheel axis of rotation; and
   c) gear train means connected to rotate with the power input shaft means for rotating the flywheel means about said flywheel axis of rotation and for rotating said driven output shaft means when the motor means rotates the power input shaft means;
   d) said gear train means being effective to rotate the flywheel means when a load is applied to the driven output shaft means so that the motor means continues to operate smoothly without being adversely affected when the motor control means increases the rotational speed of the power input shaft means for rotating the driven output shaft means through the gear train means under an increased applied load.

2. In a combination as defined in claim 1 wherein
said gear train means includes a first sun gear fixed to rotate with the power input shaft means, a first planetary gear fixed to rotate with respect to said flywheel means about a planetary axis of rotation that is parallel to and laterally spaced from the flywheel axis of rotation, a second planetary gear mounted to rotate with said first planetary gear, and a second sun gear fixed to rotate with the driven output shaft means.

3. In a combination as defined in claim 2 wherein
said first sun gear is mounted to rotate in unison with said first planetary gear, and
said second planetary gear is mounted to rotate in unison with said second sun gear.

4. In a combination as defined in claim 3 wherein
the diameter of said first sun gear is equal to the diameter of said first planetary gear, and
the diameter of said secondary planetary gear has a length different from the diameter of said second sun gear.

5. In a combination as defined in claim 4 wherein
the first sun gear includes a set of circumferential sun gear drive teeth, and
the first planetary gear includes a set of circumferential planetary driven teeth that engage and mesh with said set of circumferential sun gear drive teeth.

6. In a combination as defined in claim 5 wherein
the second planetary gear includes a set of circumferential planetary drive teeth, and
the second sun gear includes a set of circumferential sun gear driven teeth that engage and mesh with said set of circumferential planetary drive teeth.

7. In a combination as defined in claim 6 wherein
each set of said circumferential sun gear drive teeth of said first sun gear and said circumferential planetary driven teeth of said first planetary gear includes the same number of teeth with respect to each other.

8. In a combination as defined in claim 7 wherein
said set of circumferential planetary drive teeth of said second planetary gear includes a greater number of teeth that said set of circumferential sun gear driven teeth of said second sun gear.

9. In a combination as defined in claim 7 wherein
said set of circumferential planetary drive teeth of said second planetary gear includes a lesser number of teeth than said set of circumferential sun gear driven teeth of said second sun gear.

10. A power transmission assembly for rotating a drive shaft member that operates an apparatus that performs an operational function in response to motor means that rotates power input shaft means, said assembly comprising:
    a) flywheel means mounted to rotate on said power input shaft means about a flywheel axis of rotation;
    b) driven output shaft means and means for coupling said driven output shaft means to rotate said drive shaft member of said apparatus;
    c) gear train means for rotating the flywheel means about said flywheel axis of rotation when said motor means rotates the power input shaft means;
    d) said gear train means being mounted to rotate said driven output shaft means upon rotation of said power input shaft means, and
    e) said gear train means including gear means effective to rotate the flywheel means when a load is applied said drive shaft member to the driven output shaft means so that when said motor means increases the rotational speed of the power input shaft means to rotate the driven output shaft means in response to said applied load, the flywheel means will continue to rotate to thereby preclude an adverse effect on the operation of the motor means and provide torque for rotating said driven output shaft means through said gear train means.

11. A power transmission system for rotating a drive shaft of an apparatus for performing an operational function, said system comprising:
    a) motor means for regulating the rotational speed of rotatable power input shaft means; and
    b) a power transmission assembly for transmitting rotational power from the power input shaft means to rotate a driven output shaft means;
    c) said power transmission assembly including flywheel means mounted to rotate on said power input shaft means about a flywheel axis of rotation, and gear train means for rotating the flywheel means about said flywheel axis of rotation when said motor means rotates the power input shaft means;
    d) said gear train means being effective to continue rotation of the flywheel means when a load is applied by said drive shaft of said apparatus to the driven output shaft means so that when said motor means increases the rotational speed of the power input shaft means in response to said applied load, the gear train means will drivingly rotate the flywheel means that will transmit torque to said driven output shaft means through said gear train means and preclude any adverse effect on the operation of the motor means.

12. A power transmission assembly as defined in claim 10 wherein said power input shaft means includes a power input shaft member and means for coupling the power input shaft member to the motor means, said driven output shaft means includes a driven output shaft member and means for coupling the driven output shaft member to the drive shaft member of said apparatus, said power input shaft member and said driven output shaft member each being rotatably disposed to rotate about said flywheel axis of rotation, and said flywheel means is mounted to rotate about said power input shaft member and said flywheel axis of rotation.

13. A power transmission assembly as defined in claim 10 wherein said power input shaft means includes an assembly power input shaft member and means for coupling the assembly power input shaft member to a power shaft of said motor means, said driven output shaft means includes a driven output shaft member and means for coupling the driven output shaft member to the drive shaft member of said apparatus, said assembly power input shaft member and driven output shaft member each being rotatably disposed to rotate about said flywheel axis of rotation, and said flywheel means is mounted to rotate about said flywheel axis of rotation on said assembly power input shaft member and on said driven output shaft member.

14. A power transmission assembly as defined in claim 13 wherein said flywheel means includes three flywheel segments and means fixedly connecting the three flywheel segments to rotate in unison, a first flywheel segment rotates on said power input shaft member, a second flywheel segment rotates on said driven output shaft member, and a middle flywheel segment is disposed between the first and second flywheel segments.

15. A power transmission assembly as defined in claim 14 wherein said flywheel means includes spacer means disposed between said middle flywheel segment and each of said first and second flywheel segments, and said gear train means includes a first sun gear fixed to rotate with the power input shaft member, a first planetary gear fixed to rotate with respect to said flywheel means about a planetary axis of rotation that is parallel to and laterally spaced from the flywheel axis of rotation, a second planetary gear mounted to rotate with said first planetary gear about the planetary axis of ratation, and a second sun gear fixed to rotate with said driven output shaft member, said first sun gear drivingly engages said first planetary gear to rotate in unison between said first and middle flywheel segments, and said second planetary gear drivingly engages said second sun gear to rotate in unison between said second and middle flywheel segments.

16. A power transmission assembly as defined in claim 11 wherein said motor means includes a motor power shaft and said flywheel means is mounted to rotate about both said motor power shaft and said driven output shaft means.

17. A power transmission assembly as defined in claim 16 wherein said flywheel means includes three flywheel segments and means fixedly connecting the three flywheel segments to rotate in unison, a first flywheel segment rotates on said motor power shaft member, a second flywheel segment rotates on said driven output shaft means, and a middle flywheel segment is disposed between the first and second flywheel segments, said flywheel means includes spacer means and counter-balancing means disposed between said middle flywheel segment and each of said first and second flywheel segments, said gear train means includes a first sun gear fixed to rotate with the motor power shaft member, a first planetary gear fixed to a planetary shaft member to rotate with respect to said flywheel means about a planetary axis of rotation that is parallel to and laterally spaced from the flywheel axis of rotation, a second planetary gear mounted to said planetary shaft member to rotate with said first planetary gear about the planetary axis of rotation, and a second sun gear fixed to rotate with said driven output shaft means, said first sun gear drivingly engages said first planetary gear to rotate in unison between said first and middle flywheel segments, and said second planetary gear drivingly engages said second sun gear to rotate in unison between said second and middle flywheel segments.

18. In a model train locomotive having a set of drive wheels and a power system for rotating the drive wheels, said power system comprising:

a) electric motor means mounted for rotating power input shaft means, control means for regulating the amount of electric current supply to the motor means for varying the rotational speed of the power input shaft means, and power transmission means for transmitting power from the power input shaft means to rotate driven output shaft means which is coupled to rotate said drive wheels;

b) said power transmission means including flywheel means rotatably mounted on drive shaft means to rotate about an axis of rotation and gear means for rotating said flywheel means about said axis of rotation when said electric motor means is rotating the power input shaft means while the driven output shaft means is subjected to an applied load;

c) said gear means being effective to apply torque to the driven output shaft means while the flywheel means is rotating on said drive shaft means to preclude stalling the electric motor means when said control means increases the amount of electric current supplied to said motor means to increase the rotational speed of the power input shaft means for rotating said drive wheels.

19. A power system as defined in claim 18 wherein said drive shaft means includes a first drive shaft mounted to rotate about a first axis of rotation;

said gear means includes first sun gear means mounted to rotate with said first drive shaft about said first axis of rotation, second sun gear means mounted to rotate with said driven output shaft means, and first and second planetary gear means mounted to rotate with second drive shaft means about a second axis of rotation;

said first sun gear means being drivingly connected to rotate said flywheel means about said first axis of rotation;

said second drive shaft means being rotatably mounted to said flywheel means with said second axis of rotation being laterally spaced from and parallel to said first axis of rotation; and said first planetary gear means being frictionally engaged with said first sun gear means and said second planetary gear means being frictionally engaged with said second sun gear means.

20. A power system as defined in claim 19 wherein said power input shaft means is coupled directly to said first drive shaft to effect rotation of said first sun gear means about said first axis of rotation.

21. A power system as defined in claim 18 wherein said locomotive has two sets of drive wheels with each set including a worm gearset for rotating the drive wheels in each respective set, said electric motor means includes a single electric motor unit having two motor power shaft members each projecting outwardly from opposing sides of said single electric motor unit which is disposed between said two sets of drive wheels, each said motor power shaft members being drivingly coupled to operate a respective gearset.

22. In a model train locomotive having a set of drive wheels and a power system for rotating the drive wheels, said power system comprising:

a) electric motor means mounted for rotating power input shaft means, control means for regulating the amount of electric current supply to the motor means for varying the rotational speed of the power input shaft means, and power transmission means for transmitting power from the power input shaft means to rotate driven output shaft means which is coupled to rotate said drive wheels;

b) said power transmission means including flywheel means and gear means for rotating said flywheel means about an axis of rotation when said electric motor means is rotating the power input shaft means while the driven output shaft means is not rotating;

c) said gear means being effective to rotate the driven output shaft means while the flywheel means is rotating without stalling the electric motor means when said control means increases the amount of electric current supplied to said motor means to increase the rotational speed of the power input shaft means and rotate the said drive wheels;

d) said gear means including first sun gear means mounted to rotate with first drive shaft means about a first axis of rotation, second sun gear means mounted to rotate with said driven output shaft means, and first and second planetary gear means mounted to rotate with second drive shaft means about a second axis of rotation;

e) said power input shaft means is coupled directly to said first drive shaft means to effect rotation of said first sun gear means about said first axis of rotation;

f) said second drive shaft means being rotatably mounted to said flywheel means with said second axis of rotation being laterally spaced from and parallel to said first axis of rotation; and g) said first planetary gear means being frictionally engaged with said first sun gear means and said second planetary gear means being frictionally engaged with said second sun gear means;

h) said flywheel means is rotatably mounted on said first drive shaft means to rotate about said first axis of rotation;

i) said first drive shaft means including an input end portion coupled to said power input shaft means, a bearing end portion having an outer surface bearing section, and an intermediate portion located between said input and bearing end portions and having an outer intermediate surface to which said first sun gear means is affixed; and j) said driven output shaft means including an inner end section having an outside end surface to which said second sun gear means is affixed, and an inside end bearing surface that frictionally rotatably supports said outer surface bearing section of said first drive shaft means.

23. A power system as defined in claim 22 wherein drive shaft support means mounts said first drive shaft means to rotate about said first axis of rotation, and driven shaft support means mounts said driven output shaft means to rotate about said first axis of rotation.

24. A power system as defined in claim 23 wherein said drive shaft support means is disposed at a first end of an intermediate support section and said driven shaft support means is disposed at a second end of said intermediate support section, and said drive shaft support means, said driven shaft support means, and said intermediate support section together form a U-shaped structural configuration when said configuration is viewed in an elevational direction transverse to said first axis of rotation.

25. A power system as defined in claim 19 wherein each of said first sun gear means, said second sun gear means, said first planetary gear means, and said second planetary gear means consists of a single gear member having a preselected number of circumferential teeth.

26. In a model train locomotive having a set of drive wheels and a power system for rotating the drive wheels, said power system comprising:

a) electric motor means mounted for rotating power input shaft means, control means for regulating the amount of electric current supply to the motor means for varying the rotational speed of the power input shaft means, and power transmission means for transmitting power from the power input shaft means to rotate driven output shaft means which is coupled to rotate said drive wheels;

b) said power transmission means including flywheel means and gear means for rotating said flywheel means about an axis of rotation when said electric motor means is rotating the power input shaft means while the driven output shaft means is not rotating;

c) said gear means being effective to rotate the driven output shaft means while the flywheel means is rotating without stalling the electric motor means when said control means increases the amount of electric current supplied to said motor means to increase the rotational speed of the power input shaft means and rotate the said drive wheels;

d) said gear means including first sun gear means mounted to rotate with first drive shaft means about a first axis of rotation, second sun gear means mounted to rotate with said driven output shaft means, and first and second planetary gear means mounted to rotate with second drive shaft means about a second axis of rotation;

e) said second drive shaft means being rotatably mounted to said flywheel means with said second axis of rotation being laterally spaced from and parallel to said first axis of rotation; and f) said first planetary gear means being frictionally engaged with said first sun gear means and said second planetary gear means being frictionally engaged with said second sun gear means;

g) said flywheel means including first and second flywheel sections laterally spaced with respect to each other with said second drive shaft means extending between and rotatably mounted in said first and second flywheel sections;

h) said first planetary gear means being disposed between said first and second flywheel sections and said second planetary gear means being disposed on a side of one of the flywheel sections opposite a side where said first flywheel section is disposed; and i) counterbalancing means is circumferentially disposed at a location between said flywheel sections to balance the weight of the second drive shaft means and said first and second planetary gear means carried on said second drive shaft means.

27. A power transmission system for rotating driven output shaft means for operating an assembly used to perform an operational function, said system comprising:

a) motor means for rotating power input shaft means, motor control means for regulating the amount of power to the motor means to vary the rotational speed of the power input shaft means, and power transmission means for transmitting power from the power input shaft means to rotate said driven output shaft means;

b) said power transmission means including flywheel means rotatably mounted on shaft means to freely rotate with respect to said shaft means about an axis of rotation and gear means mounted to be rotated by said power input shaft means for transmitting rotational energy to rotate the flywheel means when said motor means is rotating the power input shaft means while the driven output shaft means is subject to an applied load;

c) said gear means being operatively coupled to the flywheel means to rotate the flywheel means separately and independently with respect to said driven output shaft means so that said flywheel means continues to rotate for preventing the motor means from stalling when said motor control means increases the rotational speed of the power input shaft means.

28. A power transmission system as defined in claim 27 wherein said motor means includes an electric motor, and said motor control means includes means for regulating the amount of electric current used by said electric motor.

29. A power transmission system as defined in claim 28 wherein said assembly includes a model railroad locomotive having drive wheels drivingly coupled to said driven output shaft means.

30. A power transmission system as defined in claim 28 wherein said assembly includes a hand-held manually operated drill apparatus having tool holding means drivingly coupled to said driven output shaft means.

31. A power transmission system as defined in claim 27 wherein said power input shaft means includes said drive shaft means, said flywheel means is mounted to freely rotate on said drive shaft means about said axis of rotation.

* * * * *